United States Patent [19]

Tallant, II

[11] Patent Number: 4,523,233
[45] Date of Patent: Jun. 11, 1985

[54] AUTOMATIC BIAS CONTROL SYSTEM WITH COMPENSATED SENSE POINT

[75] Inventor: James C. Tallant, II, Indianapolis, Ind.

[73] Assignee: RCA Corporation, Princeton, N.J.

[21] Appl. No.: 441,217

[22] Filed: Nov. 12, 1982

[51] Int. Cl.³ .................. H04N 5/68; H04N 9/535
[52] U.S. Cl. ...................................... 358/242; 358/65
[58] Field of Search .............. 358/242, 243, 65, 64, 358/74, 10, 139, 27, 33, 34, 40

[56] References Cited

U.S. PATENT DOCUMENTS

| | | | |
|---|---|---|---|
| 4,110,787 | 8/1978 | Parker | 358/65 |
| 4,118,731 | 10/1978 | Hinn | 358/242 |
| 4,224,640 | 9/1980 | Hovens | 358/242 |
| 4,263,622 | 4/1981 | Hinn | 358/242 |
| 4,319,166 | 3/1982 | Lavigne | 315/384 |
| 4,414,577 | 11/1983 | Tallant | 358/242 |
| 4,463,385 | 7/1984 | Parker | 358/242 |

*Primary Examiner*—Michael A. Masinick
*Attorney, Agent, or Firm*—P. J. Rasmussen; Peter M. Emanuel; Ronald H. Kurdyla

[57] ABSTRACT

In an automatic kinescope bias (AKB) control system for a television receiver, a voltage representative of kinescope bias is derived from a sensing point coupled to the television signal processing channel and to AKB signal processing circuits. A switching network attenuates large white-going television signal amplitude components at the sensing point during picture information intervals, to preclude sense point voltage levels which could otherwise ultimately disrupt the operation of the AKB signal processing circuits during AKB operating intervals.

32 Claims, 2 Drawing Figures

Fig.1

AUTOMATIC BIAS CONTROL SYSTEM WITH COMPENSATED SENSE POINT

This invention concerns a system for sensing and automatically controlling a characteristic of a signal processing network. In particular, this invention concerns a system for sensing and automatically controlling the black image current conducted by a video signal image reproducing device, wherein compensation is provided for potentially disruptive video signal components appearing at the sensing point during intervals when the control system is inactive.

Color television receivers sometimes employ an automatic kinescope bias (AKB) control system for automatically establishing proper black image representative current levels for each electron gun of a color kinescope associated with the receiver. As a result of this operation, pictures reproduced by the kinescope are prevented from being adversely affected by variations of kinescope operating parameters (e.g., due to aging and temperature effects).

An AKB system typically operates during image blanking intervals, at which time each electron gun of the kinescope conducts a small black image representative blanking current in response to a reference voltage representative of black video signal information. This current is processed by the AKB system to generate a signal which is representative of the currents conducted during the blanking intervals, and which is used to maintain a desired black current level.

In one type of AKB system control circuits respond to a periodically derived pulse signal with a magnitude representative of the cathode black current level. The derived signal is processed by control circuits including clamping and sampling networks for developing a kinescope bias correction signal which increases or decreases in magnitude and is coupled to the kinescope for maintaining a correct black current level. The clamping network includes a clamping capacitor for establishing a reference condition for the signal information to be sampled. The reference condition is established by applying a reference voltage to the clamping capacitor which is coupled to the sampling network during the clamping interval. An AKB system of this type is described in U.S. Pat. No. 4,331,981 of R. P. Parker, for example.

In the automatic control system disclosed herein, a bias representative signal is derived at a sensing point during video signal blanking intervals. The sensing point exhibits voltage variations related to amplitude variations of the video signal during video signal image intervals when signal processing circuits of the control system are inactive.

It is herein recognized that the presence of large amplitude video signals at the sensing point can have a disruptive effect on the operation of the signal processing circuits of the control system, particularly when such circuits are constructed in the form of an integrated circuit. Accordingly, a control system disclosed herein includes means for attenuating large video signal amplitude components which can appear at the control system sensing point during video signal picture intervals when the signal processing circuits of the control system are inactive.

Figure 1:
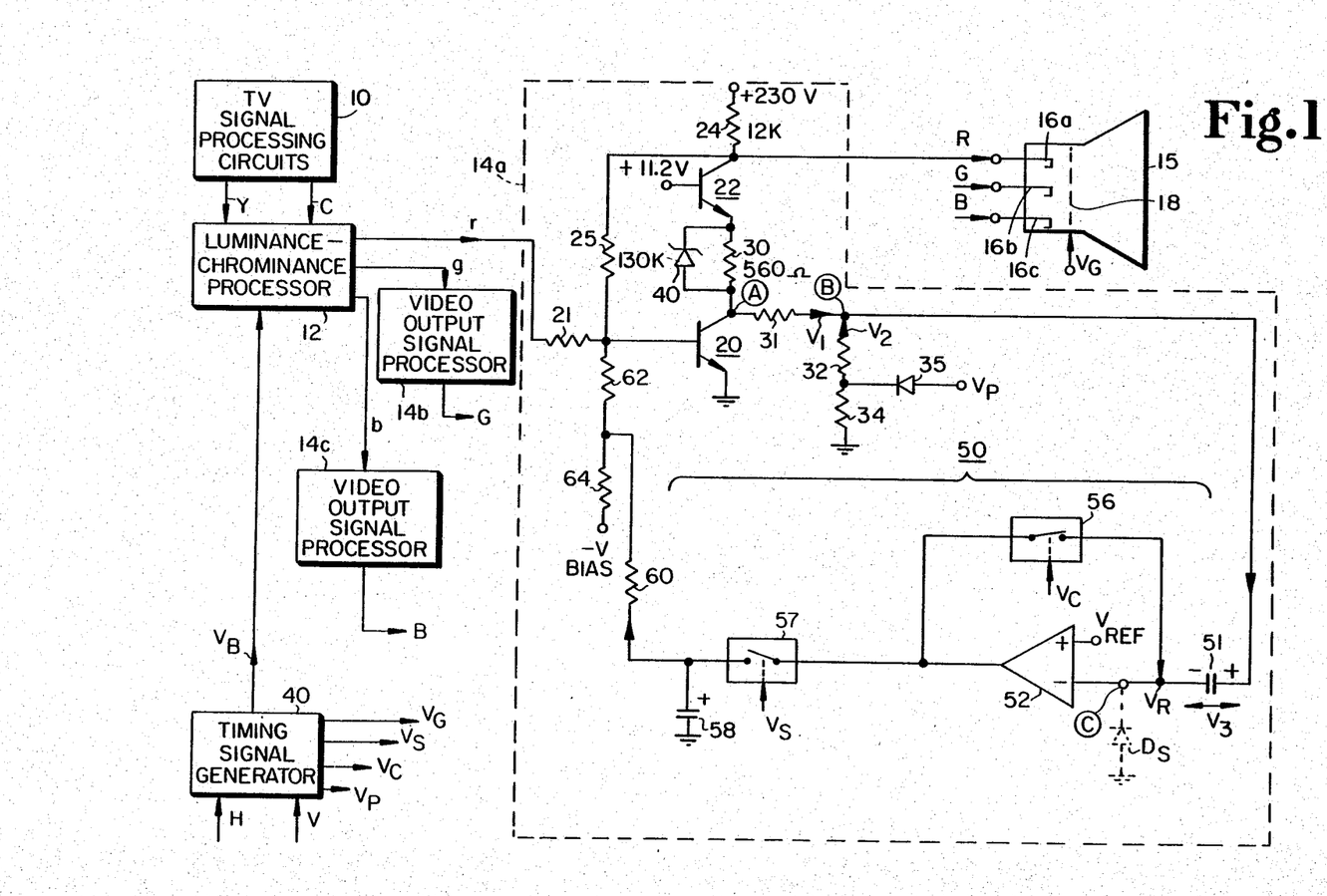
FIG. 1 shows a portion of a color television receiver with an automatic kinescope bias control system including a sensing circuit according to the principles of the present invention.

In FIG. 1, television signal processing circuits 10 provide separated luminance (Y) and chrominance (C) components of a composite color television signal to a luminance-chrominance signal processing network 12. Processor 12 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color image signals R, G and B to respective cathode intensity control electrodes 16a, 16b and 16c of a color kinescope 15. Network 14a, 14b and 14c also perform functions related to the automatic kinescope bias (AKB) control function, as will be discussed. Kinescope 15 is of the self-converging in-line gun type with a commonly energized control grid 18 associated with each of the electron guns comprising cathode electrodes 16a, 16b and 16c.

Since output signal processors 14a, 14b and 14c are similar in this embodiment, the following discussion of the operation of processor 14a also applies to processors 14b and 14c.

Processor 14a includes a kinescope driver stage comprising an input transistor 20 configured as a common emitter amplifier which receives video signal R from processor 12 via an input resistor 21, and an output high voltage transistor 22 configured as a common base amplifier which together with transistor 20 forms a cascode video driver amplifier. High level video signal R, suitable for driving kinescope cathode 16a, is developed across a load resistor 24 in the collector output circuit of transistor 22. Direct current negative feedback for driver 20, 22 is provided by means of a resistor 25. The signal gain of cascode amplifier 20, 22 is primarily determined by the ratio of the value of feedback resistor 25 to the value of input resistor 21.

A sensing resistor 30 DC coupled in series with and between the collector-emitter paths of transistor 20, 22 serves to develop a voltage, at a relatively low voltage sensing node A, representing the level of kinescope cathode black current conducted during kinescope blanking intervals. A normally non-conductive Zener Diode 40 is coupled across sensing resistor 30. Resistor 30 and Zener Diode 40 operate in conjunction with the AKB system of the receiver, which will now be described.

A timing signal generator 40 containing combinational and sequential logic control circuits as well as level shifting circuits responds to periodic horizontal synchronizing rate signals (H) and to periodic vertical synchronizing rate signals (V), both derived from deflection circuits of the receiver for generating timing signals $V_B$, $V_S$, $V_C$, $V_P$ and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent.

Figure 2:
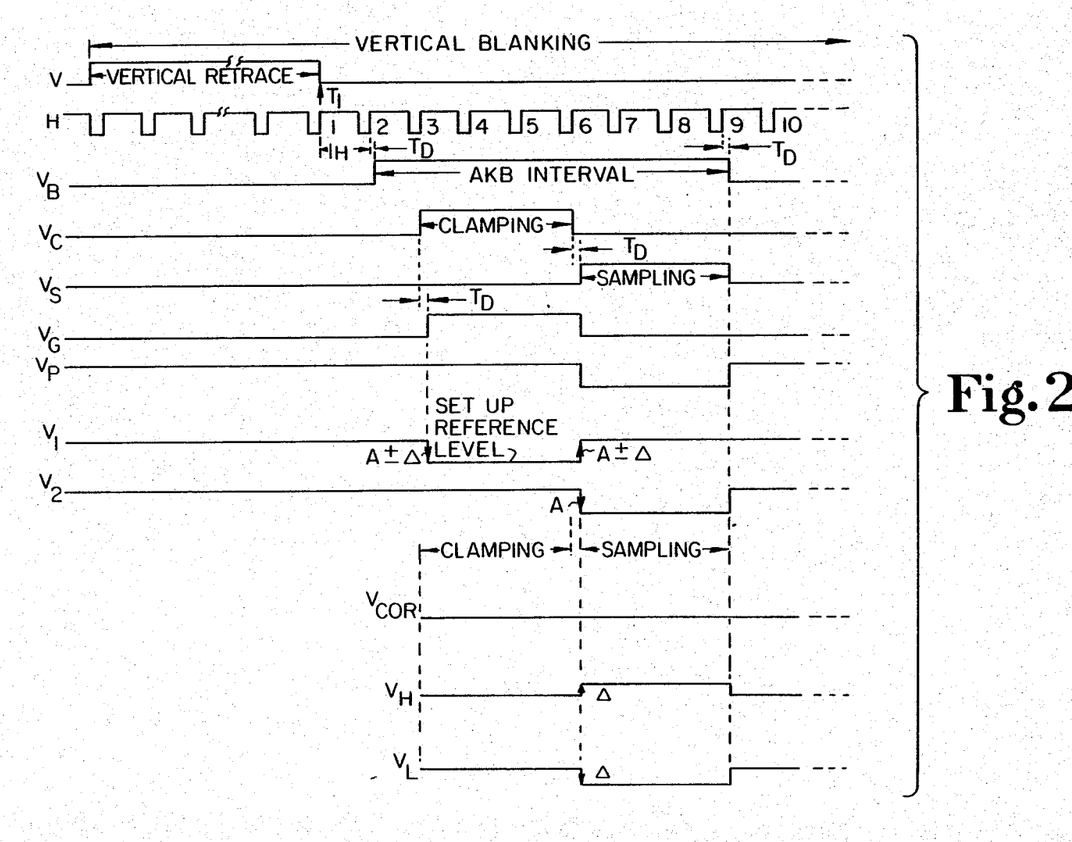
FIG. 2 illustrates signal waveforms associated with the operation of the system in FIG. 1.

These timing signals are illustrated by the waveforms in FIG. 2.

Referring to FIG. 2 for the moment, timing signal $V_B$, used as a video blanking signal, comprises a positive pulse generated soon after the vertical retrace interval ends at time $T_1$, as indicated by reference to signal waveform V. Blanking signal $V_B$ exists for the duration of the AKB interval and is applied to a blanking control input terminal of luminance-chrominance processor 12 for casing the r, g and b outputs of processor 12 to exhibit a black image representative DC reference level at the signal outputs of processor 12. Timing signal $V_G$, used as a positive grid drive pulse, encompasses three horizontal line intervals within the vertical blanking interval. Timing signal $V_C$ is used to control the operation of a clamping circuit associated with the signal sampling function of the AKB system. Timing signal $V_S$, used as a sampling control signal, occurs after signal $V_C$ and serves to time the operation of a sample and hold circuit which develops a DC bias control signal for controlling the kinescope cathode black current level. Signal $V_S$ encompasses a sampling interval the beginning of which is slightly delayed relative to the end of the clamping interval encompassed by signal $V_C$, and the end of which substantially coincides with the end of the AKB interval. A negative-going auxiliary pulse $V_P$ coincides with the sampling interval. Signal timing delays $T_D$ indicated in FIG. 2 are on the order of 200 nanoseconds.

Referring again to FIG. 1, during the AKB interval positive pulse $V_G$ (e.g., on the order of +10 volts) biases grid 18 of the kinescope for causing the electron gun comprising cathode 16a and grid 18 to increase conduction. At times other than the AKB intervals, signal $V_G$ provides the normal, less positive, bias for grid 18. In response to positive grid pulse $V_G$, a similarly phased, positive current pulse appears at cathode 16a during the grid pulse interval. The amplitude of the cathode output current pulse so developed is proportional to the level of cathode black current conduction (typically a few microamperes).

The induced positive cathode output pulse appears at the collector of transistor 22, and is coupled to the base input of transistor 20 via feedback resistor 25, causing the current conduction of transistor 20 to increase proportionally while the cathode pulse is present. The increased current conducted by transistor 20 causes a related voltage to be developed across sensing resistor 30. This voltage is in the form of a negative-going voltage change which appears at sensing node A and which is proportional in magnitude to the magnitude of the black current representative cathode output pulse. The magnitude of the voltage perturbation at node A is determined by the product of the value of resistor 30 times the magnitude of the perturbation current flowing through resistor 30. The operation of sensing resistor 30 in combination with kinescope driver 20, 22 is described in detail in copending U.S. patent application Ser. No. 394,422 of R. P. Parker, now U.S. Pat. No. 4,463,385 titled "Kinescope Black Level Current Sensing Apparatus", incorporated herein by reference. The voltage change at node A is coupled via a small resistor 31 to a node B at which a voltage change $V_1$, essentially corresponding to the voltage change at node A, is developed. Node B is coupled to a bias control voltage processing network 50.

Network 50 performs signal clamping and sampling functions. The clamping function is performed during a clamping interval within each AKB interval by means of a feedback clamping network comprising an input AC coupling capacitor 51, an amplifier 52, and an electronic switch 56. The sampling function is performed during a sampling interval, following the clamping interval during each AKB interval, by means of a network comprising amplifier 52, an electronic switch 57, and an average responding charge storage capacitor 58.

A kinescope bias correction voltage is developed across capacitor 58 and is coupled via a translating circuit comprising a resistor network 60, 62, 64 to the kinescope driver via a bias control input at the base of transistor 20. The correction voltage developed across capacitor 58 serves to automatically maintain a desired correct level of kinescope black current conduction. The bias correction voltage developed across storage capacitor 58 is a function of both voltage change $V_1$ developed at node B during the clamping interval, and a voltage change $V_2$ developed at node B during the subsequent sampling interval, as will be discussed in greater detail subsequently in connection with the waveforms shown in FIG. 2.

During the clamping set-up reference interval, switch 56 is rendered conductive in response to clamping control signal $V_C$. At this time switch 57 is non-conductive so that the charge on storage capacitor 58 remains unaffected during the clampling interval. As a consequence of the feedback action during the clamping interval, the negative terminal (−) of capacitor 51 is reference to (i.e., clamped to) a reference voltage $V_R$ which is a function of a fixed reference voltage $V_{REF}$ applied to an input of amplifier 52, for establishing an input reference bias condition at a signal input of amplifier 52 at a node C. At this time the voltage $V_3$ across input capacitor 51 is a function of the level of voltage change $V_1$ developed at node B, and the clamping reference voltage $V_R$ provided via the feedback action.

During the following sampling interval when voltage channel $V_2$ is developed at node B, switch 56 is rendered non-conductive, and switch 57 is rendered conductive in response to sampling control signal $V_S$. The magnitude of voltage change $V_2$ is indicative of the magnitude of the kinescope black current level, and is sampled by means of amplifier 52 (with respect to reference voltage $V_R$) to develop a corresponding voltage across storage capacitor 58. Network 50 can include circuits of the types described in U.S. Pat. No. 4,331,981 of R. P. Parker, and in a copending U.S. patent application of P. Filliman Ser. No. 437,827 titled "Signal Sampling Network with Reduced Offset Error". Amplifier 52 is preferably rendered non-conductive during picture intervals when the AKB clamping and sampling functions are not being performed. This can be accomplished by disabling the operating current source of amplifier 52 in response to a keying signal coincident with the picture intervals.

Zener diode 40 serves to attenuate large amplitude video signal components, and particularly video signal peaking components, which otherwise appear with significant magnitude at sensing node A during field scanning picture information intervals. In the absence of the attenuation provided by Zener Diode 40, large amplitude video signal appearing at sensing node A can ultimately disrupt the AKB signal processing function, particularly with respect to the development of clamping reference voltage $V_R$, when the AKB signal processor including amplifier 52 is constructed in the form of an integrated circuit with an input at node C, as follows.

Sensing node A and node B exhibit a nominal DC voltage ($V_{DC}$) of approximately +8.8 volts for black video signal conditions during picture intervals, as well as during AKB intervals (except when voltage change $V_2$ is generated during AKB sampling intervals as will be discussed subsequently). At the end of the AKB clamping reference interval, voltage $V_3$ across clamp capacitor 51 is equal to $V_{DC}-V_R$, where $V_{DC}$ is the nominal black level voltage (+8.8 volts) and $V_R$ is the reference voltage (e.g., +6 volts) developed at the negative terminal of capacitor 51 during the clamping interval.

During the field scanning picture interval which begins at the end of the vertical blanking interval, video signals applied to kinescope driver 20, 22 can cause large voltage transitions to be developed at the collector output of driver transistor 22 and at the kinescope cathode. A large video input signal r (e.g., a 100 IRE peak white signal) can cause the collector output voltage of driver transistor 22 to decrease by about 130 volts. A heavily peaked video signal with accentuated white-going amplitude transitions can increase the effective video signal peak white level by 20%, causing the collector output voltage of driver transistor 22 to decrese by an additional 20%. The effective peak white level of the video signal can be increased by more than 20% in receivers which do not include circuits for automatically limiting the amount of peaking present in the video signal.

A version of such peak white amplitude transitions appears at AKB sense point A, and can cause a significant and potentially troublesome negative-going transient decrease in the voltage at sense point A. This transient voltage decrease can be as great as 7.28 volts (or even greater in receivers without peak limiting circuits) according to the expression $$\Delta V_A = R_{30}/R_{24}(\Delta V_K)$$

where
  $\Delta V_A$ corresponds to the transient voltage decrease at sensing point A;
  $R_{30}$ and $R_{24}$ correspond to the values of resistors 30 and 24, respectively; and
  $\Delta V_K$ corresponds to the amount by which the kinescope cathode voltage decreases in response to large white-going video signal amplitude transitions including peaking effects (e.g., 130 volts × 1.2).

The voltage at input node C of the AKB signal processor is given by $V_A - V_3$, where $V_A$ is the voltage at sense point A and $V_3$ is the voltage across capacitor 51. More specifically, the voltage at input node C is given by $$(V_{DC}-\Delta V_A)-(V_{DC}-V_R)$$

where
  $V_{DC}$ is the nominal black level voltage at sense point A (+8.8 volts);
  $\Delta V_A$ is the transient voltage at sense point A; and
  $V_R$ is the clamping reference voltage developed on and stored at the negative terminal of capacitor 51 (+6.0 volts).

Thus in this instance large white-going video signal amplitude transitions can cause a negative voltage of −1.28 volts to appear at input node C of the AKB signal processor.

This negative voltage at node C is large enough to forward bias the integrated circuit substrate-to-ground semiconductor junction at the input of the AKB signal processor. A diode $D_S$ represents the substrate-to-ground semiconductor junction, and is forward biased into conduction since the −1.28 volt negative voltage transient at node C exceeds the threshold conduction level (0.7 volts) of substrate diode $D_S$. If this were to occur, the voltage at node C would be clamped to −0.7 volts and the negative terminal of clamp capacitor 51 would rapidly discharge to a distorted reference level which might impair the subsequent AKB clamping and sampling functions. This condition could be difficult to recover from during succeeding AKB operating intervals, and the distorted reference level could persist for a relatively long time, depending on the nature of the video signal picture information, its peaking content and duration. As a consequence, proper AKB operation could be distrupted such that an abnormally high kinescope black current level would result with an associated unwanted visible increase in picture brightness.

Zener diode 40 prevents the described objectionable effects caused by large amplitude video signals during the picture interval. Specifically, the action of diode 40 prevents clamping reference voltage $V_R$ from being disturbed from one AKB interval to another, by preventing picture interval video signal amplitude excursions of significant magnitude from being developed at AKB sensing point A, as follows.

The emitter voltage of driver transistor 22 is substantially constant (+10.5 volts), and is equal to the fixed base bias voltage of transistor 22 (+11.2 volts) minus the base-emitter junction voltage drop of transistor 22 (+0.7 volts). During AKB intervals, the collector voltage of transistor 20 and thereby the voltage at sense point A vary in response to the perturbation current conducted to the base of video signal amplifier transistor 20 via feedback resistor 25, as a function of the induced kinescope output current pulse developed as discussed previously. The voltage across sense resistor 30 changes with variations in the current conduction of transistor 20 during both AKB intervals and video information picture intervals.

Zener diode 40 is normally non-conductive, but conducts whenever the conduction of transistor 20 causes the voltage across sense resistor 30 to exceed the Zener threshold conduction voltage of diode 40. When Zener diode 40 conducts, the collector current of transistor 20 flows through Zener diode 40 rather than through sense resistor 30. At this time the voltage across resistor 30 is clamped to the fixed voltage developed across Conductive Zener diode 40, whereby the voltage across resistor 30 and the voltage at sense point A do not change. Accordingly, the amount by which the voltage at sense point A can decrease in response to a large amplitude white-going video signal is limited as a function of the voltage developed across diode 40 when conducting.

The lowest voltage capable of being developed at sense point A is equal to the substantially fixed emitter voltage of transistor 22 (+10.5 volts), minus the substantially fixed Zener voltage drop across diode 40. When diode 40 exhibits a +6.2 volt Zener voltage, the maximum voltage decrease at point A (i.e., the most negative-going transient voltage $\Delta V_A$) is limited to +4.3 volts. In such case the voltage at input node C of the AKB signal processor exhibits a corresponding minimum voltage of +1.7 volts, whereby the input substrate to ground semiconductor junction represented by diode $D_S$ is prevented from becoming forward biased. Accordingly, reference voltage $V_R$ and the AKB signal processing function remain undisturbed in the presence of large peak white video signal amplitude transitions during picture intervals.

The video output signal developed at the output of driver transistor 22 and coupled to the kinescope advantageously is not disturbed when Zener diode 40 conducts during picture intervals. This results because the emitter current of driver transistor 22 does not change when diode 40 conducts. When diode 40 conducts, the signal current which would otherwise flow through resistor 30 flows instead through conductive diode 40.

Other embodiments of the disclosed invention can be developed. For example, an electronic switch can be coupled across resistor 30 and keyed such that the switch is conductive during picture intervals and non-conductive during AKB intervals.

Following is a more detail discussion of the clamping and sampling operation of network 50, made with reference to the waveforms of FIG. 2.

Auxiliary signal $V_p$ is applied to circuit node B in FIG. 1 via a diode 35 and a voltage translating impedance network comprising resistors 32 and 34. Signal $V_P$ exhibits a given positive DC level at all times except during the AKB sampling interval, for maintaining diode 35 conductive so that a DC bias voltage is developed at node B. When the positive DC component of signal $V_P$ is present, the junction of resistors 32 and 34 is clamped to a voltage equal to the positive DC component of signal $V_P$, minus the voltage drop across diode 35. Signal $V_P$ manifests a negative-going, less positive fixed amplitude pulse component during the AKB sampling interval. Diode 35 is rendered non-conductive in response to negative pulse $V_P$, whereby the junction of resistors 32 and 34 is unclamped. Resistor 31 causes insignificant attenuation of the voltage change ($V_1$) developed at node B since the value of resistor 31 is small relative to the values of resistors 32 and 34.

Prior to the clamping interval but during the AKB interval, the pre-existing nominal DC voltage ($V_{DC}$) appearing at node B charges the positive terminal of capacitor 51. During the clamping interval when grid drive pulse $V_G$ is developed, the voltage at node A decreases in response to pulse $V_G$ by an amount representative of the black current level. This causes the voltage at node B to decrease to a level substantially equal to $V_{DC}-V_1$. Also during the clamping interval, timing signal $V_C$ renders clamping switch 56 conductive, whereby via feedback action reference voltage $V_R$ is developed at the negative terminal of clamp capacitor 51 as discussed. During the clamping interval, voltage $V_3$ across capacitor 51 is a function of reference set-up voltage $V_R$ at the negative terminal of capacitor 51, and a voltage at the positive terminal of capacitor 51 corresponding to the difference between the described pre-existing nominal DC level ($V_{DC}$) at node B and voltage change $V_1$ developed at node B during the clamping interval. Thus voltage $V_3$ across capacitor 51 during the clamping reference interval is a function of the level of black current representative voltage change $V_1$, which may vary. Voltage $V_3$ can be expressed as $(V_{DC}-V_1)-V_R$.

During the immediately following sample interval, positive grid drive pulse $V_G$ is absent, causing the voltage at node B to increase positively to the pre-existing nominal DC level $V_{DC}$ that appeared prior to the clamping interval. Simultaneously, negative pulse $V_P$ appears, reverse biasing diode 35 and perturbing (i.e., momentarily changing) the normal voltage translating and coupling action of resistors 32, 34 such that the voltage at node B is reduced by an amount $V_2$ as indicated in FIG. 2. At the same time, clamping switch 56 is rendered non-conductive and switch 57 conducts in response to signal $V_S$.

Thus during the sampling interval the voltage applied to the signal input of amplifier 52 is equal to the difference between the voltage at node B and voltage $V_3$ across input capacitor 51. The input voltage applied to amplifier 52 is a function of the magnitude of voltage change $V_1$, which can vary with changes in the kinescope black current level.

The voltage on output storage capacitor 58 remains unchanged during the sampling interval when the magnitude of voltage change $V_1$ developed during the clamping interval equals the magnitude of voltage change $V_2$ developed during the sampling interval, indicating a correct kinescope black current level. This results because during the sampling interval, voltage change $V_1$ at node B increases in a positive direction (from the clamping set-up reference level) when the grid drive pulse is removed, and voltage change $V_2$ causes a simultaneous negative-going voltage perturbation at node B. When kinescope bias is correct, positive-going voltage change $V_1$ and negative-going voltage change $V_2$ exhibit equal magnitudes whereby these voltage changes mutually cancel during the sampling interval, leaving the voltage at node B unchanged.

When the magnitude of voltage change $V_1$ is less than the magnitude of voltage change $V_2$, amplifier 52 proportionally charges storage capacitor 58 via switch 57 in a direction for increasing cathode black current conduction. Conversely, amplifier 52 proportionally discharges storage capacitor 58 via switch 57 for causing decreased cathode black current conduction when the magnitude of voltage change $V_1$ is greater than the magnitude of voltage change $V_2$.

As more specifically shown by the waveforms of FIG. 2, the amplitude "A" of voltage change $V_1$ is assumed to be approximately three millivolts when the cathode black current level is correct, and varies over a range of a few millivolts ($\pm \Delta$) as the cathode black current level increases and decreases relative to the correct level as the operating characteristics of the kinescope change. Thus the clamping interval set-up reference voltage across capacitor 51 varies with changes in the magnitude of voltage $V_1$ as the cathode black current level changes. Voltage change $V_2$ at node B exhibits an amplitude "A" of approximately three millivolts, which corresponds to amplitude "A" associated with voltage change $V_1$, when the black current level is correct.

As indicated by waveform $V_{COR}$ in FIG. 2, corresponding to a condition of correct kinescope bias, the voltage at the signal input of amplifier 52 remains unchanged during the sampling interval when voltages $V_1$ and $V_2$ are both of amplitude "A". However, as indicated by waveform $V_H$, the signal input voltage of amplifier 52 increases by an amount $\Delta$ when voltage change $V_1$ exhibits amplitude "A+$\Delta$", corresponding to a high black current level. In this event output storage capacitor 58 is discharged so that the bias control voltage applied to the base of transistor 20 causes the collector voltage of transistor 22 to increase, whereby the cathode black current decreases toward the correct level.

Conversely, and as indicated by waveform $V_L$, the signal input voltage of amplifier 52 decreases by an amount Δ during the sampling interval when voltage change $V_1$ exhibits amplitude "A−Δ", corresponding to a low black current level. In this case output storage capacitor 58 charges, causing the collector voltage of transistor 22 to decrease whereby the cathode black current increases toward the correct level. In either case, several sampling intervals may be required to achieve the correct black current level.

The described combined-pulse sampling technique employing voltage changes $V_1$ and $V_2$ is discussed in greater detail in a copending U.S. patent application Ser. No. 434,314 of R. P. Parker titled "Signal Processing Network For An Automatic Kinescope Bias Control System", incorporated herein by reference. This copending application also discloses additional information concerning the arrangement including auxiliary control signal $V_P$, as well as disclosing a suitable arrangement for timing signal generator 40.

What is claimed is:

1. In a system including a video signal channel for processing video signals including image and blanking intervals, apparatus comprising:
   means coupled to a sensing point in said video channel for deriving a signal representative of an operating characteristic of said video channel during image blanking intervals;
   signal processing means responsive to said derived representative signal for providing a control signal to said video channel for maintaining a desired condition of said operating characteristic; and
   means, coupled to said sensing point and responsive to video signals during image intervals, for attenuating amplitude excursions manifested by video signals at said sensing point during image intervals when said amplitude excursions exceed a given threshold level.

2. Apparatus according to claim 1, wherein:
   said video signal amplitude excursions exceeding said threshold level are within a range of normally expected video signal amplitude excursions.

3. Apparatus according to claim 1, wherein said attenuating means comprises switching means for providing selective attenuation of said video signal amplitude excursions at said sensing point during image intervals.

4. In a system including a video signal channel for processing video signals including image and blanking intervals, apparatus comprising:
   means coupled to a sensing point in said video channel for deriving a signal representative of an operating characteristic of said video channel during image blanking intervals;
   signal processing means responsive to said derived representative signal for providing a control signal to said video channel for maintaining a desired condition of said operating characteristic; and
   means for attenuating amplitude excursions manifested by video signals at said sensing point during image intervals when said amplitude excursions exceed a given threshold level; wherein
   said signal deriving means comprises an impedance coupled to said video signal channel, said impedance exhibiting a voltage thereacross which is related to amplitude excursions of said video signals during image intervals, and which is related to said operating characteristic of said video channel during said image blanking intervals; and
   said attenuating means limits the voltage developed across said impedance in response to said video signal amplitude excursions exceeding said threshold level during said image intervals.

5. Apparatus according to claim 4, wherein said attenuating means comprises switching means coupled to said impedance.

6. Apparatus according to claim 5, wherein said switching means is coupled across said impedance.

7. Apparatus according to claim 6, wherein said switching means comprises a normally non-conductive diode subject to being rendered conductive in response to said video signal amplitude excursions during image intervals.

8. In a video signal processing system including an image display device; and a video signal channel, including a video signal amplifier, for providing video signals including image and blanking intervals to said image display device; apparatus comprising:
   means coupled to a sensing point in said video channel for deriving a signal representative of the magnitude of black image current conducted by said image display device during image blanking intervals;
   signal processing means responsive to said derived representative signal for providing a bias control signal to said image display device for maintaining a desired level of black current; and
   means, coupled to said sensing point and responsive to video signals during image intervals, for attenuating amplitude excursions manifested by video signals at said sensing point during image intervals when said amplitude excursions exceed a given threshold level.

9. Apparatus according to claim 8, wherein:
   said video signal amplitude excursions exceeding said threshold level are within a range of normally expected video signal amplitude excursions; and
   said attenuating means does not disrupt the display of video information by said display device in response to video signals provided via said video channel.

10. In a video signal processing system including an image display device; and a video signal channel, including a video signal amplifier, for providing video signals including image and blanking intervals to said image display device; apparatus comprising:
    means coupled to a sensing point in said vide channel for deriving a signal representative of the magnitude of black image curretn conducted by said image display device during image blanking intervals;
    signal processing means responsive to said derived representative signal for providing a bias control signal to said image display device for maintaining a desired level of black current; and
    means for attenuating amplitude excursions manifested by video signal at said sensing point during image intervals when said amplitude excursions exceed a given threshold level; wherein
    said attenuating means comprises switching means for providing selective attenuation of said video signal amplitude excursions at said sensing point during image intervals.

11. In a video signal processing system including an image display device; and a video signal channel, including a video signal amplifier, for providing video signals including image and blanking intervals to said image display device; apparatus comprising:

means coupled to a sensing point in said video channel for deriving a signal representative of the magnitude of black image current conducted by said image display device during image blanking intervals;

signal processing means responsive to said derived representative signal for providing a bias control signal to said image display device for maintaining a desired level of black current; and means for attenuating amplitude excursions manifested by video signals at said sensing point during image intervals when said amplitude excursions exceed a given threshold level; wherein said signal deriving means comprises an impedance coupled to said video signal channel, said impedance exhibiting a voltage thereacross which is related to amplitude excursions of said video signals during image intervals, and which is representative of the magnitude of said black current during said image blanking intervals; and said attenuating means limits the voltage developed across said impedance in response to said video signal amplitude excursions exceeding said threshold level during said image intervals.

12. Apparatus according to claim 11, wherein said attenuating means comprises switching means coupled to said impedance.

13. Apparatus according to claim 12, wherein said switching means is coupled across said impedance.

14. Apparatus according to claim 13, wherein said switching means comprises a normally non-conductive diode subject to being rendered conductive in response to said video signal amplitude excursions during image intervals.

15. Apparatus according to claims 11, 12, 13 or 14, wherein said impedance is included in a signal conduction path of said video amplifier.

16. Apparatus according to claim 15, wherein said video amplifier corresponds to a driver amplifier for supplying video output signals to said image display device.

17. In a video signal processing system including an image display device; and a video signal channel, including a video signal amplifier, for providing video signals including image and blanking intervals to said image display device; apparatus comprising:

means coupled to a sensing point in said video channel for deriving a signal representative of the magnitude of black image current conducted by said image display device during image blanking intervals;

signal processing means responsive to said derived representative signal for providing a bias control signal to said image display device for maintaining a desired level of black current; and means for attenuating amplitude excursions manifested by video signals at said sensing point during image intervals when said amplitude excursions exceed a given threshold level; wherein said video amplifier corresponds to a driver amplifier for supplying video output signals to said image display device, comprising a first terminal for receiving video signals to be amplified, a second terminal coupled to an intensity control electrode of said image display device for supplying amplified video signals thereto, and a third terminal coupled to a reference potential and with said second terminal defining a main current conduction path of said video amplifier; and feedback means coupled from said second terminal to said first terminal of said video amplifier;

said signal deriving means comprises a sensing impedance for receiving, via said feedback means, current variations representative of black current variations manifested at said second terminal of said amplifier means so that said impedance develops a voltage thereacross representative of black current variations; and said attenuating means is coupled to said impedance for limiting video signal amplitude excursions across said impedance during image intervals.

18. Apparatus according to claim 17, wherein said attenuating means comprises switching means coupled to said impedance for selectively attenuating said video signal amplitude excursions during image intervals.

19. Apparatus according to claim 18, wherein said switching means is coupled across said impedance.

20. Apparatus according to claim 19, wherein said switching means comprises a normally non-conductive diode subject to being rendered conductive in response to said video signal amplitude excursions during image intervals.

21. Apparatus according to claims 17, 18, 19 or 20, wherein said video amplifier comprises a cascode amplifier including:

a first transistor with a first electrode for receiving video signals to be amplified, a second electrode, and a third electrode coupled to a reference potential;

a second transistor with a first electrode coupled to a bias voltage, a second electrode coupled to an operating voltage supply via a load impedance and coupled to an intensity control electrode of said image display device for supplying amplified video signals thereto, and a third electrode coupled to said second electrode of said first transistor; and wherein said feedback means is coupled from said second electrode of said second transistor to said first electrode of said first transistor; and said sensing impedance is coupled between said second electrode of said first transistor and said third electrode of said second transistor.

22. A video signal processing system including an image display device; a video signal channel including a video signal amplifier for providing amplified video signals having image and blanking intervals to said image display device; and apparatus for automatically controlling the level of black image current conducted by said image display device, said control apparatus being operative during control intervals within image blanking intervals, and comprising:

means coupled to a sensing point in said video channel for deriving a signal representative of the magnitude of black image current conducted by said image display device during image blanking intervals;

signal sampling means coupled to said sensing point for receiving said representative signal at a signal input, for providing an output bias control signal to said image display device for maintaining a desired black current level;

a charge storage device coupled to said signal sampling means;

means operative during a reference interval within said control interval for establishing a reference bias voltage on said charge storage device and a corresponding reference bias condition for said signal sampling means; and means for attenuating amplitude excursions manifested by video signals at said sensing point during image intervals when said amplitude excursions exceed a given threshold level.

23. Apparatus according to claim 22, wherein said charge storage device comprises a capacitor for coupling said representative signal from said sensing point to said signal input of said signal sampling means, said capacitor having a first terminal coupled to said sensing point, and a second terminal coupled to said signal input of said sampling means;

said reference voltage is established at said second terminal of said capacitor; and said signal input of said sampling means corresponds to an input of an integrated circuit device incorporating said sampling means.

24. Apparatus according to claim 23, wherein said signal deriving means comprises an impedance coupled to said video signal channel, said impedance exhibiting a voltage thereacross which varies with amplitude excursions of said video signals during image intervals, and said impedance exhibiting a voltage thereacross which is representative of the magnitude of said black current during image blanking intervals; and said attenuating means comprises switching means coupled to said impedance for selectively limiting the voltage developed across said impedance in response to video signal amplitude excursions exceeding said threshold level during said image intervals.

25. Apparatus according to claim 24, wherein said switching means is coupled across said impedance.

26. Apparatus according to claim 25, wherein said switching means comprises a normally non-conductive diode subject to being rendered conductive in response to said video signal amplitude excursions during image intervals.

27. Apparatus according to claim 24, 25 or 26, wherein said impedance is included in a signal conduction path of said video amplifier.

28. In a video signal processing system including an image display device responsive to video signals applied thereto, a driver amplifier for said display device comprising:

a first terminal for receiving video signals to be amplified, a second terminal coupled to an an operating potential via an output load impedance and to an intensity control electrode of said image display device for supplying amplified video signals thereto, and a third terminal coupled to an operating potential and with said second terminal defining a main video signal current conduction path of said video amplifier;

a sensing impedance coupled to said main current conduction path remote from said output impedance;

means for conveying to said sensing impedance a signal representative of the bias condition of said image display device during image blanking intervals, for developing at a sensing point coupled to said sensing impedance a voltage related to said bias condition; and means, coupled to said sensing point and responsive to video signals during image intervals, for attenuating amplitude excursions manifested by video signals at said sensing point during image intervals when said amplitude excursions exceed a given threshold level.

29. An amplifier according to claim 28, wherein said sensing impedance is coupled in series with said main current conduction path; and said conveying means comprises feedback means coupled from said second terminal to said first terminal.

30. In a video signal processing system including an image display device responsive to video signals applied thereto, a driver amplifier for said display device comprising:

a first terminal for receiving video signals to be amplified, a second terminal coupled to an operating potential via an output load impedance and to an intensity control electrode of said image display for supplying amplified video signals thereto, and a third terminal coupled to an operating potential and with said second terminal defining a main video signal current conduction path of said video amplifier;

a sensing impedance coupled to said main current conduction path remote from said output impedance;

means for conveying to said sensing impedance a signal representative of the bias condition of the said image display device during image blanking intervals for developing at a sensing point coupled to said sensing impedance a voltage related to said bias condition; and means for attenuating amplitude excursions manifested by video signals at said sensing point during image intervals when said amplitude excursions exceed a given threshold level; wherein said sensing impedance is coupled in series with said main current conduction path;

said conveying means comprises feedback means coupled from said second terminal to said first terminal; and said attenuating means comprises switching means coupled to said impedance means, said switching means being rendered conductive for attenuating said video signal amplitude excursions at said sensing point during image intervals.

31. An amplifier according to claim 30, wherein said switching means comprises a diode.

32. In a video signal processing system including an image display device responsive to video signals applied thereto, a driver amplifier for said display device comprising;

A first terminal for receiving video signals to be amplified, a second terminal coupled to an operating potential via an output load impedance and to an intensity control electrode of said image display device for supplying amplified video signals thereto, and a third terminal coupled to an operating potential and with said second terminal defining a main video signal current conduction path of said video amplifier;

a sensing impedance coupled to said main current conduction path remote from said output impedance;

means for conveying to said sensing impedance a signal representative of the bias condition of said image display device during image blanking intervals, for developing at a sensing point coupled to said sensing impedance a voltage related to said bias condition; and means for attenuating amplitude excursions manifested by video signals at said sensing point during image intervals when said amplitude excursions exceed a given threshold level; wherein said video signal amplitude excursions exceeding said threshold level are within a range of normally expected video signal amplitude excursions; and said attenuating means does not disrupt the display of video information by said display device in response to video signal provided via said driver amplifier.

* * * * *